United States Patent Office 3,107,248
Patented Oct. 15, 1963

3,107,248
PROCESS FOR PRODUCING QUINACRIDONES
Joseph H. Cooper, Hillside, N.J., assignor to E. I. du Pont de Nemours and Company, Wilmington, Del., a corporation of Delaware
No Drawing. Filed Jan. 24, 1961, Ser. No. 84,529
8 Claims. (Cl. 260—279)

This invention relates to a new process for the preparation of quinacridone compounds.

According to this invention, quinacridone compounds are prepared by the aromatic cyclodehydration of diarylaminobenzenedicarboxylic acids of the class represented by the following formulas:

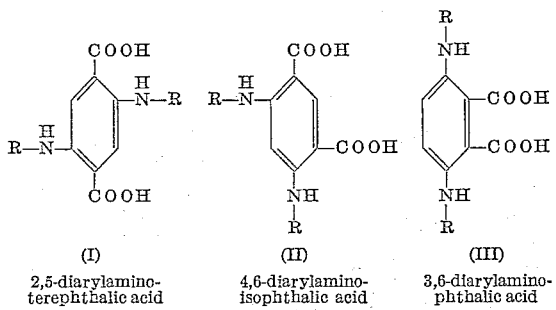

| (I) | (II) | (III) |
|---|---|---|
| 2,5-diarylamino-terephthalic acid | 4,6-diarylamino-isophthalic acid | 3,6-diarylamino-phthalic acid | where R is in an aryl radical with at least one unsubstituted position ortho to the —NH— group. Cyclodehydration, as used herein, is defined as the type of cyclization in which the elements of water are eliminated from a compound with the establishment of a new aromatic ring (C. Bradsher and R. Wert, J. Am. Chem. Soc. 62, 2806 (1940)). On cyclodehydration, a compound having the structure I have yields a quin(2,3b)-acridine-7,14 (5,12H)dione (linear quinacridone). A compound having structure II yields a quin(3,2b)acridine, 12,14(5,7H) dione, otherwise known as an isoquinacridone, and a compound having structure III yields a quin(3,2a)acridine-13,14(5,8H)dione, which is also known as an angular quinacridone. Cyclodehydration is accomplished by heating the diarylaminobenzenedicarboxylic acid with sodium hydrogen sulfate or potassium hydrogen sulfate. In a preferred embodiment of this invention, the cyclodehydration reaction is effected by passing a thin layer of pre-mixed reactants comprising a diarylaminobenzenedicarboxylic acid of the above-mentioned class and sodium hydrogen sulfate or potassium hydrogen sulfate at reaction temperature between and in contact with the surface of a cylinder and the surface of a screw rotating within the cylinder. Reaction takes place while the thin layer of reactants is passed along the rotating screw.

Summarizing the prior art briefly, Liebermann et al., in Annalen 518, 245 (1935), disclose the preparation of 2,5-dianilinoterephthalic acid and its cyclodehydration by various procedures. The preferred cyclodehydration procedure of this publication involves heating 2,5-dianilinoterephthalic acid with a relatively large amount of boric acid at temperatures in the range of 320–330° C. Liebermann et al. also disclose cyclodehydration by heating the 2,5-dianilinoterephthalic acid with phosphorus pentoxide in suspension in p-cymene. They also state that the same compound has been prepared by reaction of the 2,5-dianilinoterephthalic acid with HBr and also with a mixture of $PCl_5$ and $AlCl_3$. U.S. Patent 2,821,529 shows direct cyclodehydration of 2,5-dianilinodihydroterephthalic esters to dihydroquinacridone by heating such esters in suspension in an inert, high-boiling organic liquid at a temperature of about 250° C. for a prolonged period. In order to convert the dihydroquinacridone to quinacridone, the dihydro derivative must be removed from the organic liquid and oxidized in a separate operation. The removal of the organic liquid requires extensive washing with solvents such as alcohol. A recent Australian patent application, Serial No. 49,630, discloses formation of quinacridone sulfonic acid by reacting a 2,5-diarylaminoterephthalic acid with chlorosulfonic acid or sulfuric acid. The quinacridone sulfonic acid obtained is then desulfonated by heating at superatmospheric pressure with dilute sulfuric acid. Cyclodehydration of 4,6-dianilinoisophthalic acid to isoquinacridone by first heating with $PCl_5$ in xylene and subsequently heating with aluminum chloride is described by Eckert and Seidel (J. prakt Chem. 102, 338–360 (1921)).

It is an object of this invention to provide a new and improved process for the cyclodehydration to quinacridone compounds of diarylaminobenzenedicarboxylic acids of the class of 2,5-diarylaminoterephthalic acid, 4,6-diarylaminoisophthalic acid, and 3,6-diarylaminophthalic acid, said aryl group in each case having an unsubstituted position ortho to the —NH— group. A further object of the invention is a low-cost process for cyclodehydration of the aforementioned diarylaminobenzenedicarboxylic acids to quinacridone compounds which does not require the use of large quantities of concentrated acids with the attendant problems of corrosion, safety, and disposal, nor the use of high-boiling organic liquids, which are difficult to separate from the desired product.

The objects of this invention are realized by heating a diarylaminobenzenedicarboxylic acid of the class of 2,5-diarylaminoterephthalic acid, 4,6-diarylaminoisophthalic acid, and 3,6-diarylaminophthalic acid, where said aryl group has an unsubstituted position ortho to the —NH— group, with sodium hydrogen sulfate or potassium hydrogen sulfate to effect cyclodehydration of said diarylbenzenedicarboxylic acid to a quinacridone compound.

In the preferred embodiment of this invention, an intimate mixture is prepared of one mol of a diarylaminobenzenedicarboxylic acid of the aforementioned class with about 1½ mols of sodium hydrogen sulfate or potassium hydrogen sulfate and the mixture is heated to temperatures in the range 150–300° C. and maintained at that temperature for a sufficient period to form a new aromatic ring system with the elimination of water. When a 2,5-diarylaminoterephthalic acid of the aforementioned class is cyclodehydrated in this way, a quin (2,3b)acridone-7,14(5,12H)dione (also known as linear quinacridone) is formed; cyclodehydration of 4,6-diarylaminoisophthalic acid yields a quin(3,2b)acridine-12,14 (5,7H)dione (otherwise known as an isoquinacridone); and a 3,6-diarylaminophthalic acid yields a quin(3,2a)-acridine 13,14(5,8H)dione. After heating, the mixture is cooled to room temperature and any unreacted material is removed by washing. The product is isolated in conventional fashion by filtration, washing, and drying.

The reaction can advantageously be carried out by passing a thin layer of reactants, including an intimate mixture of an alkali hydrogen sulfate with a diarylaminobenzenedicarboxylic acid compound selected from the class of 2,5-diarylaminoterephthalic acid, 4,6-diarylaminoisophthalic acid, and 3,6-diarylaminophthalic acid, said aryl group in each case having an unsubstituted position ortho to the —NH— group, at reaction temperature between and in contact with the inner surface of a cylinder and the surface of a screw rotating within said cylinder. The thickness of the layer may range from about ¼" to ½", and is controlled by the size of the shaft on the screw within the cylinder. An oversized shaft which has a clearance of about ¼" to ½" between it and the wall of the cylinder will keep the reactants at the proper thickness. The maintenance of this thin layer is essential to the success of this embodiment of the invention, and a thickness of about ¼" is preferred. It is also essential

Example I 103 parts (.85 mol) of anhydrous sodium hydrogen sulfate is intimately mixed with 297 parts (0.85 mol) of 2,5-dianilinoterephthalic acid by crushing the two substances together in a mortar and screening the resulting powder through a fine sieve. The mixture is placed in a glass-lined vessel of such size that the mixture occupies approximately 20% of the total volume and the vessel is then placed in an oven and heated to 250° C. The mixture, in the vessel, is kept in the oven at 250° C. for approximately 2 hours, after which it is removed and allowed to cool. The cooled product is then crushed in a mortar and stirred into a mixture of 6000 parts of ethanol with 7000 parts of water to which sufficient sodium hydroxide is added to produce a pH greater than 11. The resulting slurry is heated to the boil, with stirring, and maintained at the boil for approximately 15 minutes, after which it is filtered hot and washed free of soluble salts with water. The washed presscake is dried in an oven at about 60° C. to yield 123 parts of quinacridone as a red powder.

Example II

An intimate mixture of 163 parts (1.35 mols) of sodium hydrogen sulfate with 237 parts (.68 mol) of 2,5-dianilinoterephthalic acid is heated to 250° C. and maintained at 250° C. for 2 hours. The mixture is then cooled and extracted by heating in an alcoholic sodium hydroxide solution as described in Example I. On drying the extracted product, a yield of 70 parts of quinacridone is obtained.

Example III

An intimate mixture of 199 parts (1.66 mols) of potassium hydrogen sulfate with 325 parts (.93 mol) of 2,5-dianilinoterephthalic acid is placed in a glass-lined vessel and heated to 250° C. during one hour and maintained at 245–255° C. for two hours. The mixture is then cooled to room temperature and added to 10,000 parts of boiling water and the resulting slurry is boiled for one hour. The mixture is then filtered and washed with boiling water to freedom from sulfate, after which the washed presscake is dried in an oven at 100° C. A yield of 131 parts of quinacridone is obtained which corresponds to 45% of the theoretical yield calculated on the amount of dianilinoterephthalic acid.

Example IV 175 parts (1.46 mols) of pulverized anhydrous sodium hydrogen sulfate is intimately mixed with 325 parts (.93 mol) of 2,5-dianilinoterephthalic acid. (Mol ratio sodium hydrogen sulfate to dianilinoterephthalic acid equals 1.5:1.) This mixture is then fed into a screw-tube reactor as shown in the drawing of U.S. Patent 2,964,532. This reactor consists of a tube 24″ long with an inside diameter of about 1″. The interior of the tube is glass-coated, and it contains a glass-coated screw. The flight of the screw is just slightly smaller than the inside diameter of the tube, and the flight depth is about ¼″ so that a layer of material passing through the tube has a maximum thickness of about ¼ of an inch. The screw is rotated at such a rate that the residence time in the tube is approximately 16 minutes. Four thermocouples are placed along the screw. Two of these are near the ends of the tube, and the other two are so located as to divide the space between the two outer thermocouples approximately into three equal parts. The operating temperatures as registered by the thermocouples (reading from the inlet end of the tube) are, respectively, 180° C., 265° C., 260° C., and 260° C.

The heated product which has been transported through the tube is cooled to room temperature and then powdered by crushing in a mortar, after which it is stirred into a mixture of approximately 5000 parts of water with 5000 parts of ethanol and sufficient sodium hydroxide to maintain a pH greater than 11. The resulting slurry is heated to the boil, with stirring, stirred at the boil for approximately 30 minutes and then filtered hot and washed with hot water to freedom from soluble salts. The washed presscake is dried in an oven at 100° C. to yield 248 parts of a red powder identified by infrared spectra and X-ray diffraction pattern as β-phase quinacridone described in U.S. 2,844,485, mixed with a small portion of γ-phase quinacridone described in U.S. 2,844,541. The yield corresponds to approximately 85% of the theoretical, calculated on the quantity of terephthalic acid compound in the starting mixture.

Example V

The procedure for this example is the same as that described for Example IV except for differences in temperatures of the screw tube reactor. In this example, the operating temperatures as registered by the thermocouples (reading from the inlet end of the tube) are, respectively, 200° C., 300° C., 305° C., and 300° C. A yield of quinacridone, in the β phase, corresponding to 70% of the theoretical is obtained.

Example VI

An intimate mixture of equimolar quantities of 2,5-bis(o-chloroanilino)terephthalic acid and potassium hydrogen sulfate is prepared. This mixture is passed through the screw tube reactor of Example IV with the speed of rotation of the screw adjusted to provide a residence time of approximately 15 minutes. In this example, the operating temperatures as registered by the thermocouples (reading from the inlet end of the tube) are, respectively, 200° C., 300° C., 305° C., and 300° C. The discharge from the tube is allowed to cool to room temperature, after which it is crushed. The crushed powder is then extracted by mixing it with boiling water in the proportion of 20 parts of water per part of powder, and stirring at the boil for about 30 minutes. The slurry is filtered hot, washed with hot water to freedom from soluble salts, and the washed presscake is dried in an oven. A yield of 60% of the theoretical quantity of 4,11-dichloroquinacridone is obtained.

Example VII 205 parts (1.5 mols) of powdered potassium hydrogen sulfate is intimately mixed with 376 parts (1.0 mol) of powdered 2,5 - bis(4 - methylanilino)terephthalic acid by tumbling the two together and brushing the mixture through a 60-mesh screen. The mixture is then placed in an open top cylindrical stainless steel container of such size that the mixture occupies only about 30% of the total volume and the container is then placed in an oven heated at 250° C. The mixture is heated to 250° C. and maintained at that temperature for about 2 hours. The container is then removed from the oven and cooled to room temperature, after which the contents are removed and powdered by grinding in a mortar. The crushed powder is then added to a boiling mixture of 5000 parts of ethanol (containing 0.5% benzene as a denaturant) with 7000 parts of water, to which sodium hydroxide has been added to give a pH above 11. The resulting slurry is stirred at the boil for about an hour, after which it is filtered hot, washed free of salts with hot water, and then dried in an oven. 2,9-dimethylquinacridone is obtained as a bluish-red powder.

Example VIII 175 parts (1.46 mols) of pulverized anhydrous sodium hydrogen sulfate is intimately mixed with 325 parts (.94 mol) of 4,6-dianilinoisophthalic acid. This mixture is passed through the screw-tube reactor with the screw speed adjusted to provide a retention time in the tube of about 16 minutes and with the temperatures adjusted as indicated in Example VI. The crude reaction product from the tube is boiled with approximately 15 parts of water to one part of reaction product, and the slurry is filtered and washed with hot water to remove water-soluble materials. The washed presscake is dried in an oven at 100° C. A yield of 260 parts of a yellow powder is obtained, corresponding to 76% of the theoretical yield based on the quantity of 4,6-dianilinoisophthalic acid used in the original mixture. The product is identified as quin(3,2b)acridine - 12,14(5,7H)dione, more commonly called isoquinacridone, by infrared spectrum and X-ray diffraction pattern.

Example IX 180 parts (1.5 mols) of pulverized anhydrous sodium hydrogen sulfate is intimately mixed with 348 parts (1.0 mol) of 3,6-dianilinophthalic acid. The mixture is then placed in an open top cylindrical glass-lined container of such size that the mixture occupies no more than about ⅔ the volume of the container and the container is then placed in an oven heated at 250° C. The mixture is heated to 250° C. and kept at that temperature for about two hours, after which it is removed from the oven and cooled to room temperature. The mixture is then crushed to a powder and added to approximately 15,000 parts of boiling water, maintained at a pH above 11 by the addition of sodium hydroxide. The resulting slurry is stirred at the boil for about an hour, after which it is filtered hot, washed free of soluble salts with hot water, and then dried in an oven. Quin(3,2a)acridine-13,14(5,8H)dione is obtained as a yellow powder.

In place of the 180 parts of sodium hydrogen sulfate used in Example IX, 205 parts of potassium hydrogen sulfate can be used with similar results.

Other 2,5 - diarylaminoterephthalic acids, 4,6 - diarylaminoisophthalic acids, and 3,6-diarylaminophthalic acids which contain in the arylamino moiety an unsubstituted position ortho to the —NH— group can be cyclodehydrated to a correspondingly substituted quinacridone compound by heating with an alkali hydrogen sulfate as described in the foregoing examples. For example, cyclodehydration of 2,5-bis(4-fluoroanilino)terephthalic acid yields 2,9-difluoroquinacridone, and 2,5-bis(4-methoxyanilino)terephthalic acid yields 2,9-dimethoxyquinacridone. Similarly, diarylaminobenzenedicarboxylic acids of the instant class, in which the aryl group is naphthyl with an unoccupied position ortho to the —NH— group, can be cyclodehydrated to a quinacridone compound by the process of the invention. Extension of the process to cyclodehydration of other compounds of the aforementioned class will be obvious to those skilled in the art in the light of the examples given herein.

Sodium hydrogen sulfate or potassium hydrogen sulfate can be used in the process of the invention. Sodium hydrogen sulfate monohydrate is also effective, but when it is used, it is desirable to increase the quantity to compensate for the water content. The quantity of alkali hydrogen sulfate used is not critical, but for optimum results it is desirable to use at least 1 mol per mol of the compound being cyclodehydrated. Very large quantities of alkali hydrogen sulfate, such as 10 mols per mol of compound being reacted, are effective but obviously they are not practical because of the cost of the excess salt and the small quantity of product which can be obtained from a given volume of reactants.

Effective temperatures for the process are in the range of between 150° C. and the decomposition temperature of the organic acid being cyclodehydrated. Optimum temperatures are in the range of 200–320° C. The time and temperature can be varied successfully over a wide range by those skilled in the art. The optimum time of heating depends greatly on the equipment in which the reaction is carried out. Thus, a heating period of the order of a few minutes is sufficient when the reaction is carried out in a thin layer using a screw tube reactor as described in the examples, but two hours or more are required when a conventional batch operation is used. Good contact between the reactants is essential for optimum results, and accordingly it is desirable to use an intimate mixture of the reactants. For this reason, the reactants are preferably powdered prior to mixing.

The use of the screw tube reactor favors intimate mixing of the reactants and, in general, the use of this equipment leads to better yields than when the reaction is carried out in conventional equipment. The length and diameter of the reactor tube of the screw tube reactor used for cyclodehydration can be varied over a wide range, and these dimensions are largely controlled by economic factors. The speed of rotation and the necessary retention time for satisfactory reaction control the output of the unit, and obviously a longer unit can give a higher productivity with the same retention time. For all sizes of reactor tubes, the flight of the screw conveyors should be only slightly less than the inside diameter of the reactor tube, and the diameter of the screw shaft should provide a clearance of ¼" to ½" between the shaft and the inner wall of the cylinder to keep the layer of reactants at the proper thickness.

A ceramic-coated steel screw and a ceramic-lined steel tube are preferred for the reactor, but other materials can be used which have a surface inert to the reactants, are sufficiently smooth to enable the reaction mass to slip forward during the rotation, and possess adequate mechanical strength and heat resistance to endure the stresses involved in the reaction.

Heating of the screw tube reactor can be accomplished in a variety of ways. Electrical heating is preferred because of ease of control, but heating by gas or oil flames and the like is also suitable. The number and types of heating units can be varied according to the desired temperature profile, as will be apparent to those skilled in the art.

Inert solid diluents such as clay, sand, salt, and the like may be included in the reactant mixture to improve working properties of the mixture and aid control of reactant flow and heat transfer, but the presence of such inert diluents is not an essential part of the invention.

Separation of the reaction product from excess alkali hydrogen sulfate and by-products can be effected in a variety of ways. A preferred procedure is to extract the reaction product mixture with dilute alkali solution and filter and wash the product with hot water. Various other procedures for removal of impurities from the product mixture can be used and are within the knowledge of those skilled in the art.

The present invention offers a simple efficient means for cyclodehydration of diarylaminobenzenedicarboxylic acids selected from the group of 2,5-diarylaminoterephthalic acids, 4,6-diarylaminoisophthalic acids, and 3,6-diarylaminophthalic acids, wherein said aryl group has at least one unsubstituted position ortho to the —NH— group. The process of this invention, in contrast to prior art procedures, does not require the use of an organic solvent; does not involve the use of concentrated acid solutions; does not require the use of reagents which are difficult to remove from the product; and uses low-cost, readily available cyclodehydration agents. A further advantage is that the process can be readily adapted to continuous operation with consequent economic advantages therefrom.

Since it is obvious that many changes and modifications can be made in the above-described details without departing from the nature and spirit of the invention, it The embodiments of the invention in which an exclusive property or privilege is claimed are defined as follows:

1. A process for the production of a quinacridone compound comprising heating to reaction temperature an alkali metal hydrogen sulfate with a diarylaminobenzenedicarboxylic acid selected from the group consisting of 2,5-diarylaminoterephthalic acids, 4,6-diarylaminoisophthalic acids, and 3,6-diarylaminophthalic acids, wherein said aryl groups are selected from the group consisting of phenyl and naphthyl and have an unsubstituted position ortho to the —NH— group and the diarylamino groups and carboxylic groups are the only substituents on the central benzene ring of said dicarboxylic acid.

2. A process for the production of a quinacridone compound comprising heating an alkali metal hydrogen sulfate selected from the group consisting of potassium hydrogen sulfate, sodium hydrogen sulfate, and sodium hydrogen sulfate monohydrate, with a diarylaminobenzenedicarboxylic acid selected from the group consisting of 2,5-diarylaminoterephthalic acids, 4,6-diarylaminoisophthalic acids, and 3,6-diarylaminophthalic acids, wherein said aryl groups are selected from the group consisting of phenyl and naphthyl and have an unsubstituted position ortho to the —NH— group and the diarylamino groups and carboxylic groups are the only substituents on the central benzene ring of said dicarboxylic acid, said heating being conducted at temperatures of above about 150° C. and below the decomposition temperature of the benzenedicarboxylic acid.

3. A process for the production of linear quinacridone comprising heating 2,5-dianilinoterephthalic acid with an alkali metal hydrogen sulfate selected from the group consisting of potassium hydrogen sulfate, sodium hydrogen sulfate, and sodium hydrogen sulfate monohydrate, said heating being conducted at temperatures of above about 150° C. and below the decomposition temperature of the dianilinoterephthalic acid.

4. A process for the production of 4,11-dichloro linear quinacridone comprising heating 2,5-bis(2-chloroanilino)terephthalic acid with an alkali metal hydrogen sulfate selected from the group consisting of potassium hydrogen sulfate, sodium hydrogen sulfate, and sodium hydrogen sulfate monohydrate, said heating being conducted at temperatures of above about 150° C. and below the decomposition temperature of the terephthalic acid.

5. A process for the production of 2,9-difluoro linear quinacridone comprising heating 2,5-bis(4-fluoroanilino)terephthalic acid with an alkali metal hydrogen sulfate selected from the group consisting of potassium hydrogen sulfate, sodium hydrogen sulfate, and sodium hydrogen sulfate monohydrate, said heating being conducted at temperatures of above about 150° C. and below the decomposition temperature of the terephthalic acid.

6. A process for the production of 2,9-dimethyl linear quinacridone comprising heating 2,5-bis(p-toluidino)terephthalic acid with an alkali metal hydrogen sulfate selected from the group consisting of potassium hydrogen sulfate, sodium hydrogen sulfate, and sodium hydrogen sulfate monohydrate, said heating being conducted at temperatures of above about 150° C. and below the decomposition temperature of the terephthalic acid.

7. A process for the production of isoquinacridone comprising heating 4,6-dianilinoisophthalic acid with an alkali metal hydrogen sulfate selected from the group consisting of potassium hydrogen sulfate, sodium hydrogen sulfate, and sodium hydrogen sulfate monohydrate, said heating being conducted at temperatures of above about 150° C. and below the decomposition temperature of the isophthalic acid.

8. A process for the production of angular quinacridone comprising heating 3,6-dianilinophthalic acid with an alkali metal hydrogen sulfate selected from the group consisting of potassium hydrogen sulfate, sodium hydrogen sulfate, and sodium hydrogen sulfate monohydrate, said heating being conducted at temperatures of above about 150° C. and below the decomposition temperature of the phthalic acid.

References Cited in the file of this patent

UNITED STATES PATENTS 2,821,529   Struve _____ Jan. 28, 1958

FOREIGN PATENTS 577,527   Canada _____ June 9, 1959
805,247   Great Britain _____ Dec. 3, 1958

OTHER REFERENCES

Liebermann: Liebigs Annalen, volume 518, pages 245–250 (1935).
Theilheimer: "Synthetic Methods of Organic Chemistry," volume 6, page 112 (1952).
Migrdichian: Organic Synthesis, volume II, pages 835–836, 1957.